(12) United States Patent
Majumdar et al.

(10) Patent No.: US 9,551,613 B2
(45) Date of Patent: Jan. 24, 2017

(54) MOBILE PHONE HYPERSPECTRAL IMAGER WITH SINGLE-FRAME SPATIAL, SPECTRAL AND POLARIZATION INFORMATION

(75) Inventors: Zigurts Krishna Majumdar, Washington, DC (US); Allan O. Steinhardt, Herndon, VA (US); Lyla Joanna Fischer, Bluffton, IN (US)

(73) Assignee: BOOZ, ALLEN & HAMILTON, McLean, VA (US)

( * ) Notice: Subject to any disclaimer, the term of this patent is extended or adjusted under 35 U.S.C. 154(b) by 961 days.

(21) Appl. No.: 13/248,935

(22) Filed: Sep. 29, 2011

(65) Prior Publication Data

US 2012/0081695 A1 Apr. 5, 2012

Related U.S. Application Data

(60) Provisional application No. 61/387,698, filed on Sep. 29, 2010.

(51) Int. Cl.
*G01J 3/28* (2006.01)
*G01J 3/02* (2006.01)

(52) U.S. Cl.
CPC ............ *G01J 3/0272* (2013.01); *G01J 3/0221* (2013.01); *G01J 3/0224* (2013.01); *G01J 3/28* (2013.01); *G01J 3/2823* (2013.01)

(58) Field of Classification Search
CPC ........... G01J 3/28; G01J 3/2823; G01J 3/0272
USPC ......................................................... 356/326
See application file for complete search history.

(56) References Cited

U.S. PATENT DOCUMENTS

| | | | |
|---|---|---|---|
| 6,171,793 B1 * | 1/2001 | Phillips et al. | 435/6.18 |
| 7,414,723 B2 * | 8/2008 | Lewis et al. | 356/402 |
| 7,420,663 B2 | 9/2008 | Wang et al. | |
| 2004/0239798 A1 * | 12/2004 | Nayar et al. | 348/362 |
| 2005/0162650 A1 | 7/2005 | Yamamoto | |
| 2005/0232486 A1 * | 10/2005 | Koyama | 382/176 |
| 2009/0152454 A1 * | 6/2009 | Nelson | A61B 5/0059 250/252.1 |
| 2009/0279805 A1 | 11/2009 | Qian et al. | |

(Continued)

OTHER PUBLICATIONS

William R. Johnson et al., "Snapshot Hyperspectral Imaging in Ophthalmology", Journal of Biomedical Optics, vol. 12, No. 1, Jan./Feb. 2007, pp. 014036-1-014036-7.

(Continued)

*Primary Examiner* — Kara E Geisel
*Assistant Examiner* — Dominic J Bologna
(74) *Attorney, Agent, or Firm* — Buchanan Ingersoll & Rooney PC

(57) ABSTRACT

A portable spectroscopic device for acquiring single-frame spatial, spectral, and polarization information of an object. The device includes a modular dispersion element assembly that is coupled to a mobile computing device and disperses light into a plurality of different wavelengths. The mobile computing device includes a sensor and is configured to receive and analyze the plurality of wavelengths. The mobile computing device is also configured to perform automatic calibrations to determine the absolute wavelength axis and make stray-light corrections with minimal user intervention, thus making it amenable for untrained users not familiar with the state of the art. The mobile computing device is also configured to extend dynamic range.

16 Claims, 14 Drawing Sheets

(56) References Cited

U.S. PATENT DOCUMENTS

2009/0318815 A1    12/2009  Barnes et al.
2010/0182598 A1*    7/2010  Choi et al. .................... 356/323
2010/0309454 A1    12/2010  Zhang

OTHER PUBLICATIONS

Ashwin Wagadarikar et al., "Single Disperser Design for Coded Aperture Snapshot Spectral Imaging", Applied Optics, vol. 47, No. 10, Apr. 1, 2008, pp. B44-B51.
International Search Report (PCT/ISA/210) dated Apr. 23, 2012, issued in corresponding International Application No. PCT/US2011/053994.
Written Opinion of the International Searching Authority (PCT/ISA/237) dated Apr. 23, 2012, issued in corresponding International Application No. PCT/US2011/053994.

* cited by examiner

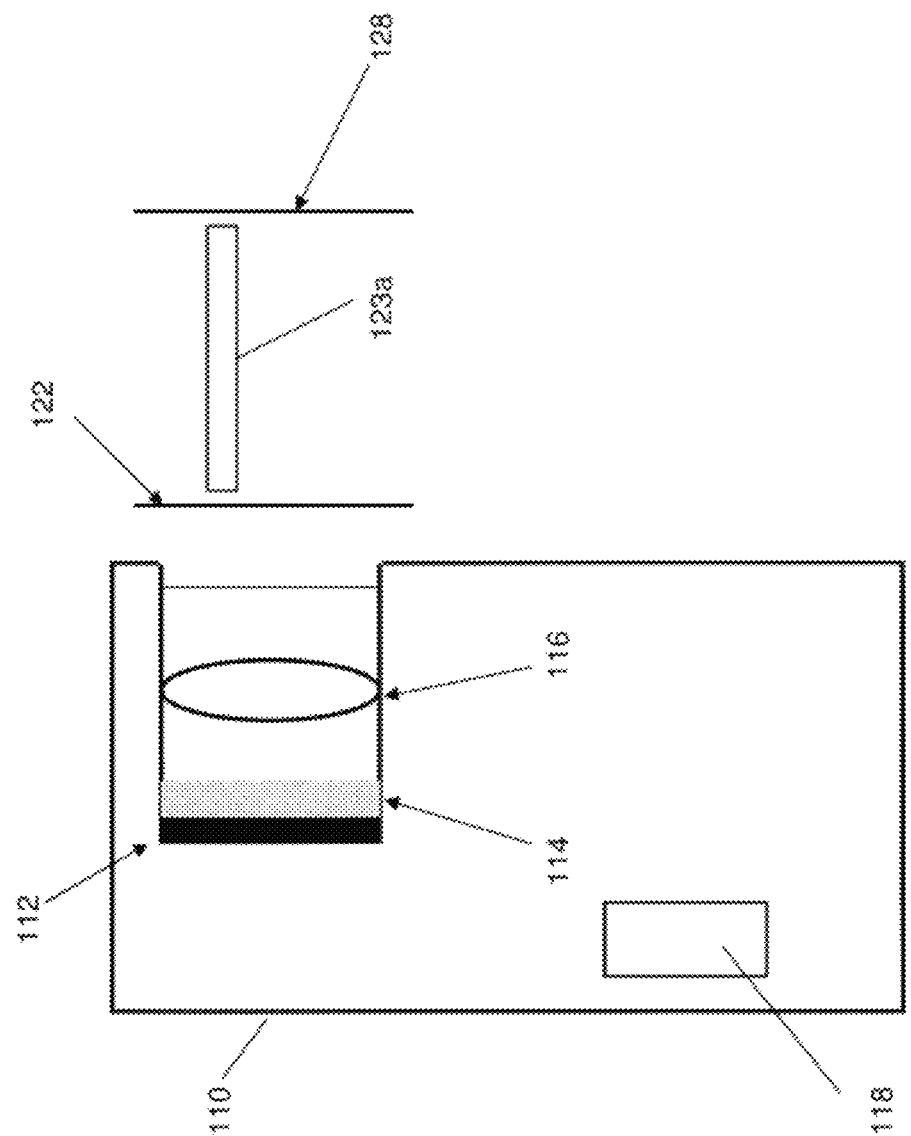

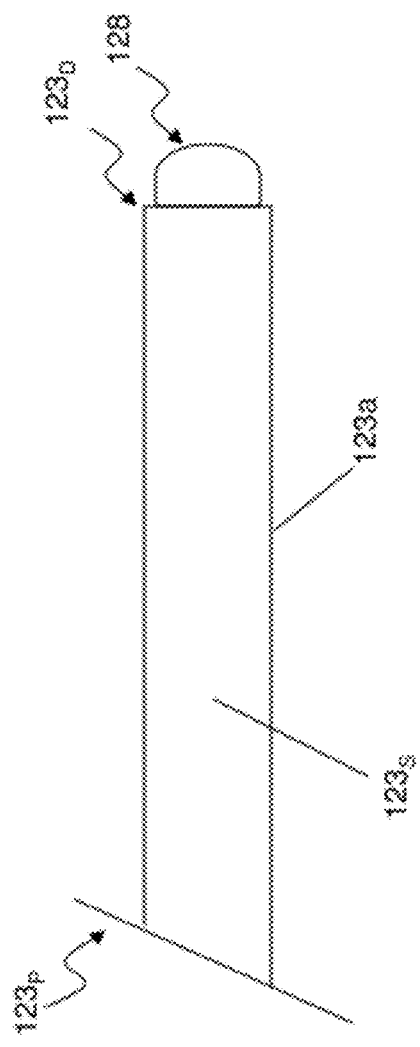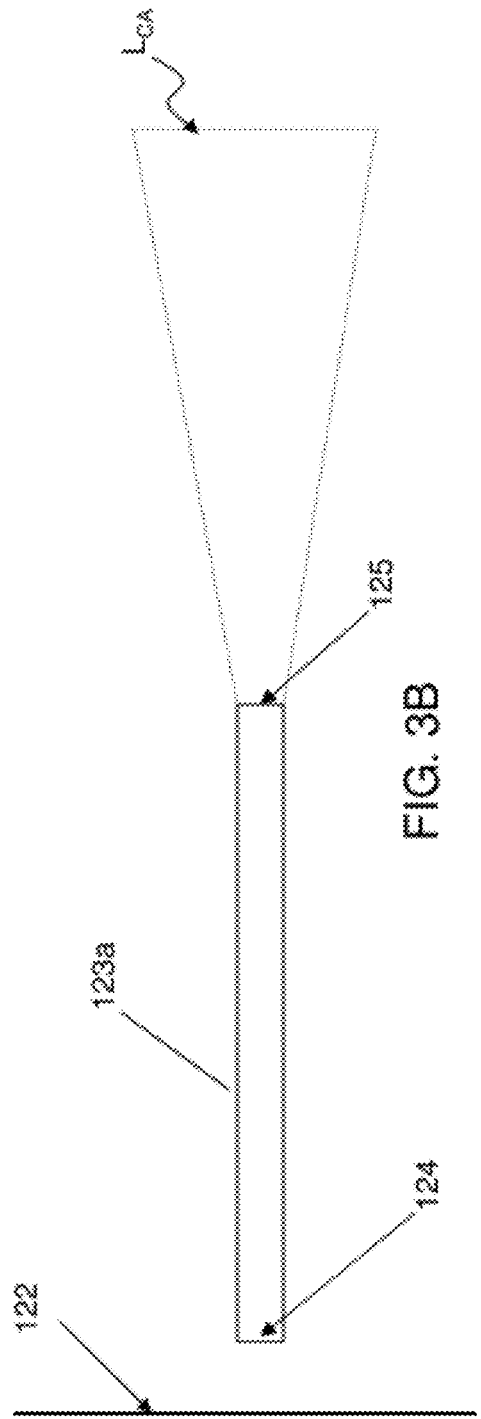

MOBILE PHONE HYPERSPECTRAL IMAGER WITH SINGLE-FRAME SPATIAL, SPECTRAL AND POLARIZATION INFORMATION

FIELD OF THE INVENTION

The present disclosure relates to optical spectroscopy. In particular, the disclosure relates to a series of modular spectroscopic elements capable of acquiring polarization resolved hyperspectral images when combined with a mobile communication device including a sensor in order to utilize computing resources and a range of available functions of a wireless communication network.

BACKGROUND OF THE INVENTION

Optical spectroscopy is widely used in scientific research, as well as environmental, medical, security and military applications. Known spectrometers and spectral imagers are applicable to astronomy, medical diagnostics (e.g., measuring blood oxygenation), military remote sensing, forensics, paints and textiles, and pollution detection (e.g., lead and mercury levels in water), to name a few.

Mobile communication devices, such as mobile phones, are often equipped with a built-in digital camera that can be used for imaging. The present inventors realized that with the addition of an optical spectroscopic module, a mobile communication device could be utilized as a portable spectrometer as well as a multimodal imager that acquires spatial, spectral and polarization information with a removable module. Some effort has been made to integrate an optical spectroscopic module with a mobile communication device in order to develop a portable, stand-alone spectroscopic device. In such integrated systems, a received optical signal is separated into a plurality of wavelength components, which are then measured. Therefore, to obtain a spectral image in such known systems, optical images, corresponding to each of the plurality of wavelength components, must be combined. Moreover, these systems are designed as a single, integrated device. In some known systems, the mobile communication device is physically modified to include an integrated wavelength selective element, as well as a built-in digital camera, in order to obtain a spectrum of an optical signal. Such integrated designs, however, lack in convenience. Moreover, it is difficult to implement or retrofit mobile communication devices already existing in the market, which may result in reduced functionality of the original mobile device. Furthermore, such known mobile device based systems can only obtain spectral information in a single-frame, or, a combination of spectral and spatial information in a series of multiple frames. The acquisition of only spectral information, via a mobile communication device of known systems, while perhaps beneficial for some practical applications of optical spectroscopy, is limited because spatial information is not also acquired at the same time. Thus, such known systems leave room for improvement. Without the acquisition of both spectral and spatial information, variations in spectral signatures as a function of position and time may be obscured because both pieces of information cannot be obtained in a single frame of acquisition. Furthermore, such known systems do not have the capability to acquire polarization information in the same frame, which is another commonly used source of information to characterize objects and distinguish between them. It is clear to those familiar with the state of the art that the invention and claims presented herein are readily applicable to "stand-alone" modules that may consist of a sensor external to the digital camera already contained in mobile computing devices that can be connected, for example, via wired (such as USB port) or wireless connections such as blue tooth to the mobile device to harness the computing capability. Although the present invention and claims also apply to such aforementioned embodiments, these are likely to drive up cost and complexity for consumers and other non-specialist users that are envisioned as the potential beneficiaries of the current invention that describes a modular platform compatible with sensors and imaging assemblies already contained within commercially available mobile computing devices.

Thus, a need exists for a portable spectroscopic device that acquires spatial and spectral information in a single frame of image capture. A further need exists for a portable spectroscopic device that obtains polarization information along with spatial and spectral information in the same frame of data acquisition. Yet a further need exists for a portable spectroscopic device featuring a removable dispersion element.

SUMMARY OF THE INVENTION

Portable spectroscopic devices for acquisition of spatial, spectral and polarization information in a single frame of data acquisition of an object are disclosed herein.

It is noted initially that, as used herein, the term "single-frame", refers to data acquisition within a single data interval (also known as "integration time") determined by the imager in any embodiment. "Frame" is used in the conventional sense to denote a "snapshot" to be contrasted with the use of filter wheels, acousto-optic tunable filters (AOTFs) or liquid crystal (LC) tunable filters, that are commonly used in hyperspectral imaging, whereby each spectral band is acquired serially, i.e., in a sequence of "frames" or "snapshots". Because the integration time and data rate of two-dimensional (2D) imaging arrays can exceed the current speed of AOTFs, filter wheels, and LC tunable filters (typical ranges using CMOS, CCDs and other focal plane arrays can range from microsecond to second integration times as well as frame rates ranging from 1 MHz to less than Hz) and given the uncertainty in the speed of motion of objects to be imaged, it is pertinent to specify this distinction, describing practical embodiments by which such an imaging modality can acquire spatial, spectral and polarization data in a single frame of acquisition.

It is also noted that "commercial imager" refers to any imager that includes a sensor and imaging assembly made to project light from an object onto the sensor. Typically, these are made to approximate the response of the human eye by recording intensity information as well as color information. Color information is typically obtained by dividing the sensor into three spectral bands referred to as red (R), green (G), and blue (B) whose spectral response is similar to that of the human cone photo-receptors and is also designed to reproduce numerous colors based on industry color standards. The disclosure is not limited to this, as use of it with assembled and separately acquired components is also possible.

Exemplary embodiments of the present disclosure provide an advantageous feature by which a portable spectroscopic device acquires spatial, spectral, and polarization information of an object in a single-frame. A modular dispersion element that is removably coupled to a mobile computing device disperses light into a plurality of different wavelengths, and the mobile computing device receives and analyzes the plurality of wavelengths that performs computations that serve to correct, calibrate and render the data in a useable format, e.g., mapping the a wavelength axis along to an axis in the pixel space on an imaging sensor whereby the plurality of wavelengths collected can be distinctly resolved. The modular dispersion element can be used in combination with various apertures and polarizers such that the mobile computing device receives spatial, spectral and polarization information projected onto regions of the sensor chip.

According to an exemplary embodiment, the present disclosure provides a portable spectroscopic device that acquires spatial, spectral, and polarization information in a single frame. A modular dispersion element that is coupled to a mobile computing device disperses light into a plurality of different wavelengths. The mobile computing device, which includes a sensor, is thereby configured to receive and analyze the plurality of wavelengths. The mobile computing device is also configured to extend dynamic range by at least one of (a) obtaining a plurality of images at different integration times and light intensities and (b) fitting a shape function to an intensity profile orthogonal to the wavelength axis that serves to enable more accurate determination of the true intensity present in wavelength regions where some fraction of the pixels are saturated due to the limited range of the sensor of the device.

According to another exemplary embodiment, a portable spectroscopic device for acquiring spatial, spectral, and polarization information from an object includes a mobile computing device including a lens and an optical sensor and a dispersion element as disclosed herein. The dispersion element is configured to be removeably coupled to the lens of the mobile computing device and to disperse light into a plurality of different wavelengths. The mobile computing device is configured to receive the plurality of different wavelengths, to determine an axis along the sensor corresponding to a spatially separated plurality of wavelengths, and to perform a calibration that automatically (for example, via image processing algorithms explained later in more detail) defines an axis along a dimension of the sensor corresponding to the wavelength dimension.

According to an exemplary embodiment, the present disclosure provides a method for acquiring single-frame spatial, spectral, and polarization information from an object in a portable spectroscopic device. Light is differentially dispersed based on a plurality of different wavelengths, spatial positions and polarizations. Axes along an image sensor that correspond to a spatially separated plurality of wavelengths, spatial points and polarizations are determined.

These and other features of the present disclosure will be readily appreciated by one of ordinary skill in the art from the following detailed description of various implementations when taken in connection with the accompanying drawings.

BRIEF DESCRIPTION OF THE DRAWING FIGURES

FIG. 2 is a block diagram illustrating a cross-sectional view, along a Y-axis, of the portable spectroscopic device of FIG. 1.

FIGS. 3A and 3B are block diagrams illustrating a cross-sectional view, along a Y-axis, of a removable assembly of the portable spectroscopic device of FIG. 1.

Figure 6A:
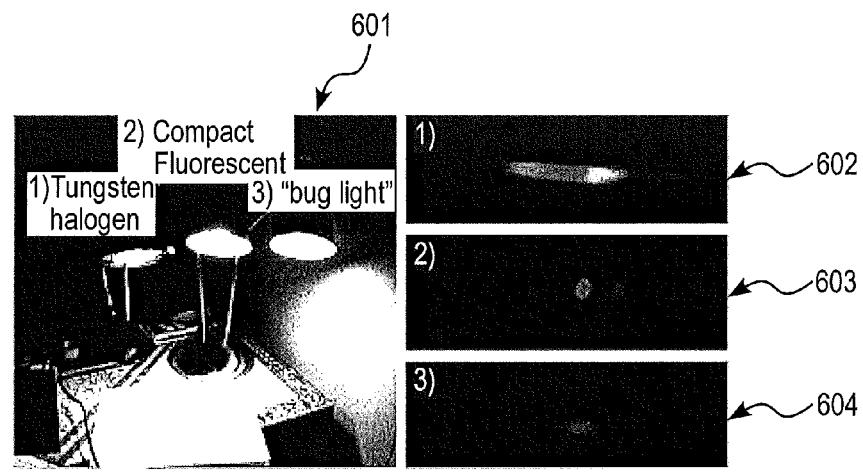
FIG. 6A is an illustration depicting a plurality of light sources and corresponding dispersed spectra obtained utilizing the portable spectroscopic device of FIG. 2.
Figure 6B:
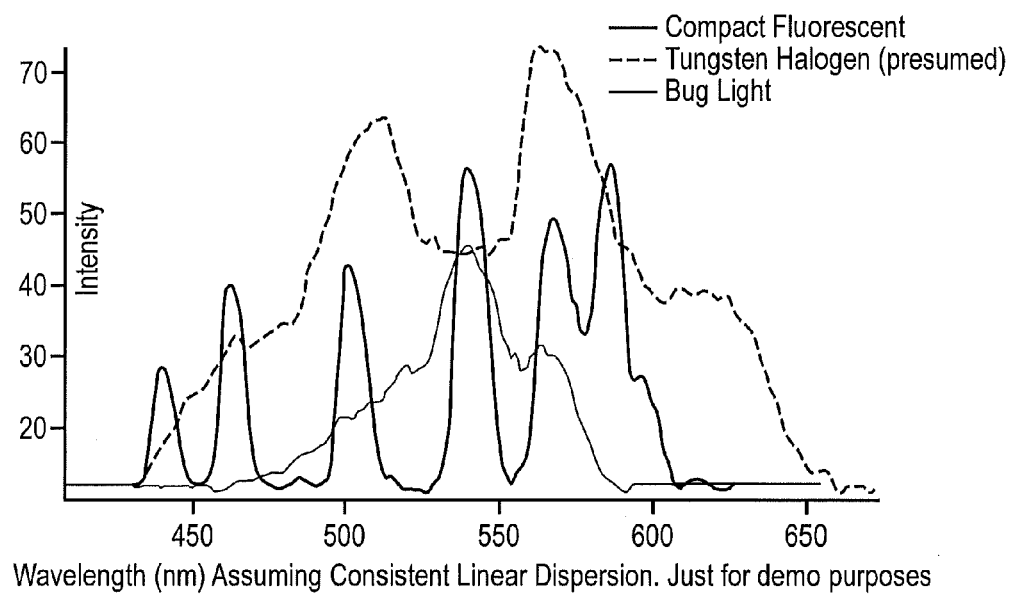
FIG. 6B is a graphical representation of the spectral data pertaining to the light sources derived from the dispersed spectrums of FIG. 6A.
Figure 6C:
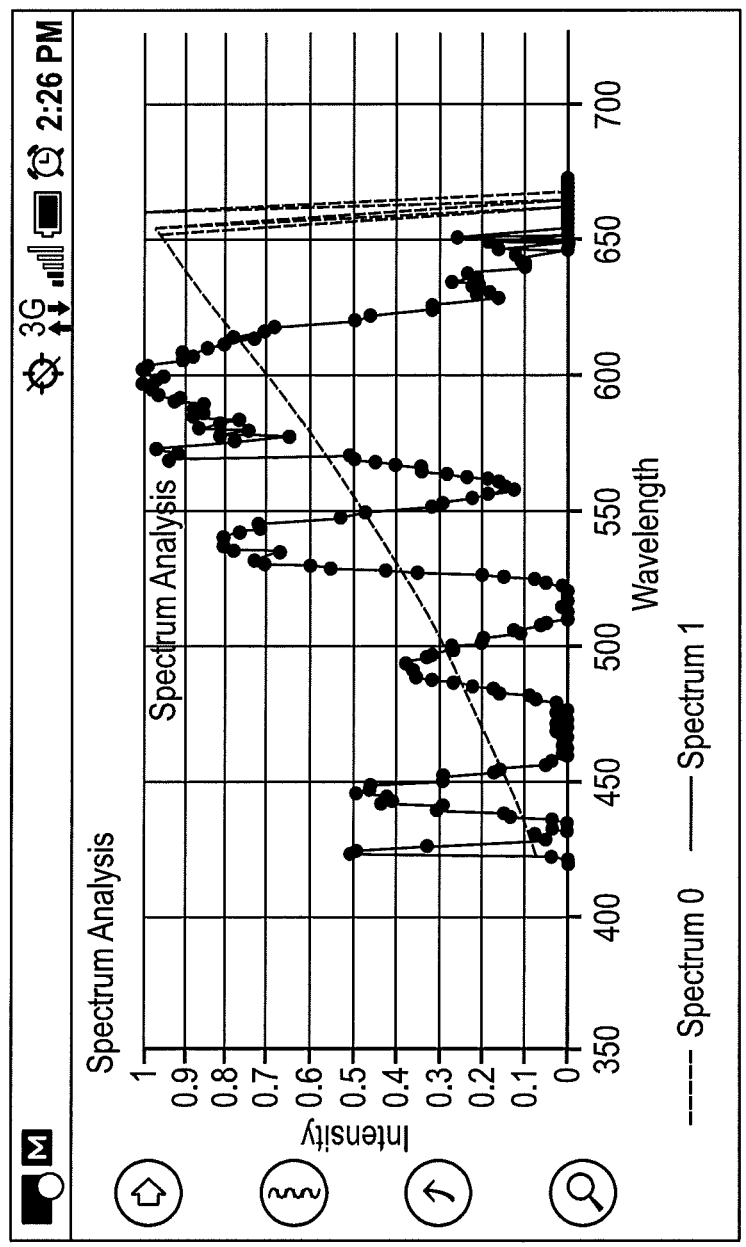

FIG. 6C is a graphical representation of two data sets acquired, automatically processed and displayed on the screen of an Android "smart phone" (HTC EVO brand) resulting from an embodiment conceptually equivalent to that depicted in FIG. 2. The processing that consists of the steps described herein was performed by a prototype embodiment "smart phone App" that was developed and installed on the HTC EVO phone with all processing performed locally by the press of a button on the touch screen display by the user.

Figure 7A:
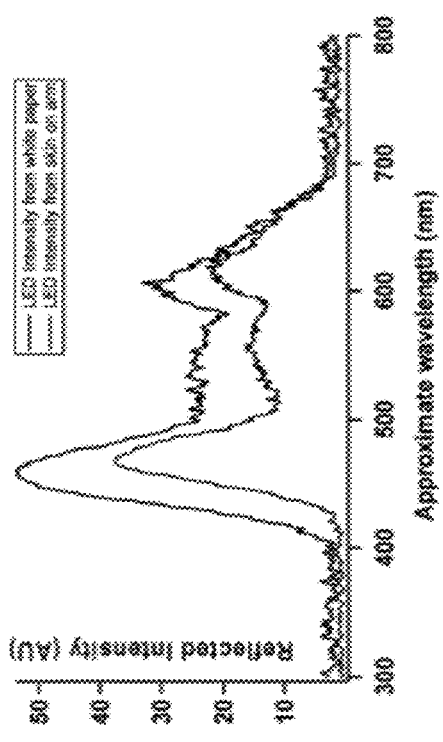

FIG. 7A is a graphical representation of data obtained utilizing the portable spectroscopic device of FIG. 2 in measuring the reflection from paper and human skin using a light emitting diode (LED) as an illumination source.

Figure 7B:
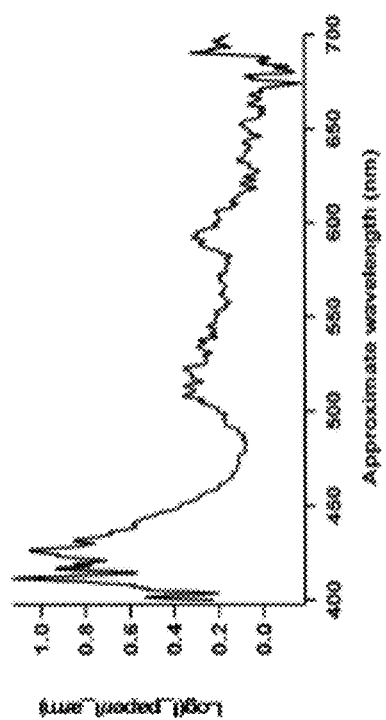

FIG. 7B is a graphical representation of a calculation to the data of FIG. 7A that depicts a wavelength dependent curve proportional to the measured absorption spectrum of human skin.

Figure 8C:
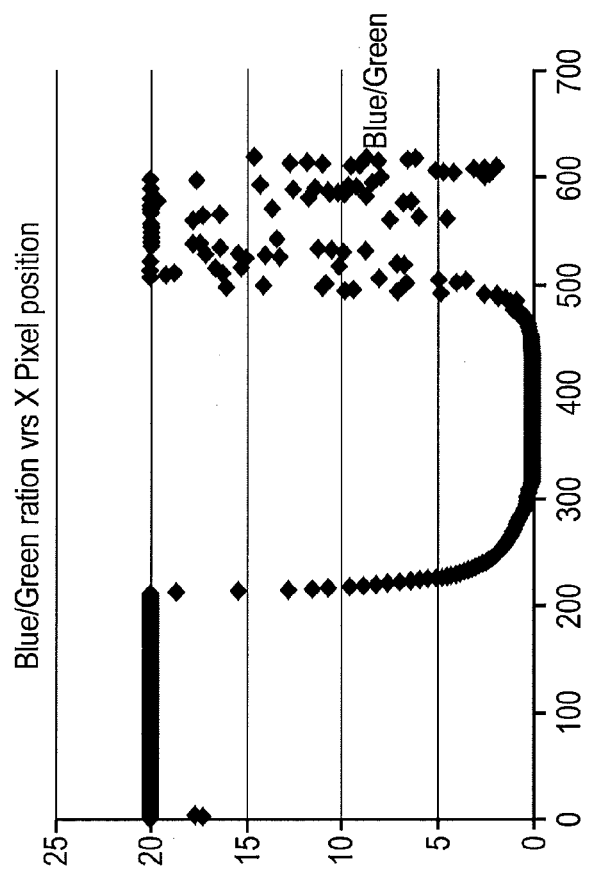
Figure 8A:
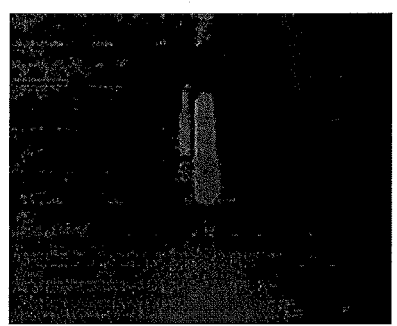
Figure 8B:
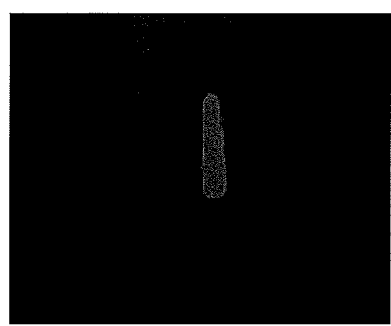

FIGS. 8A, 8B and 8C illustrate analysis methods allowing for automatic calibration that defines a linear axis along which the plurality of wavelengths are spatially separated according to an embodiment.

Figure 9:
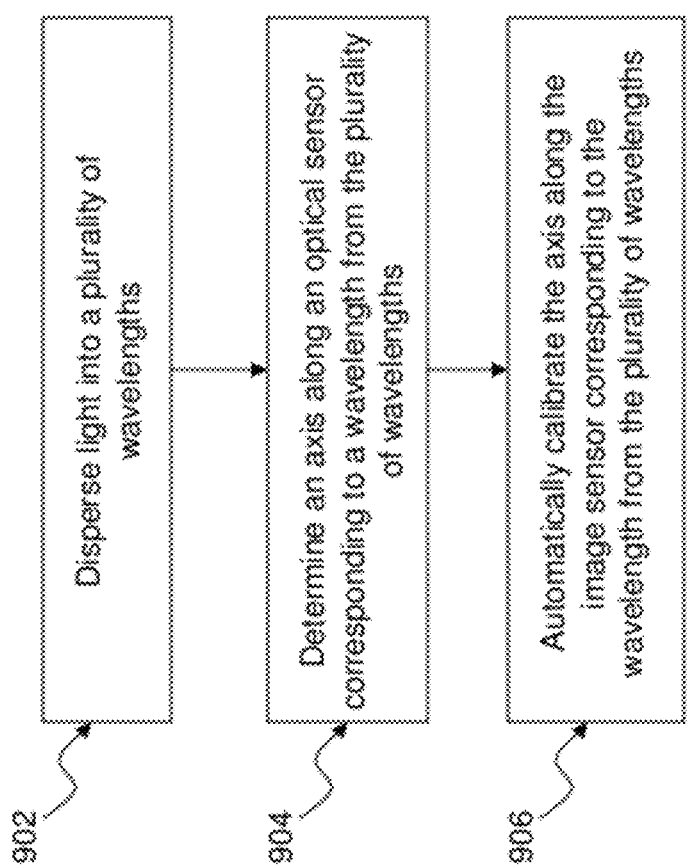
Figure 10:
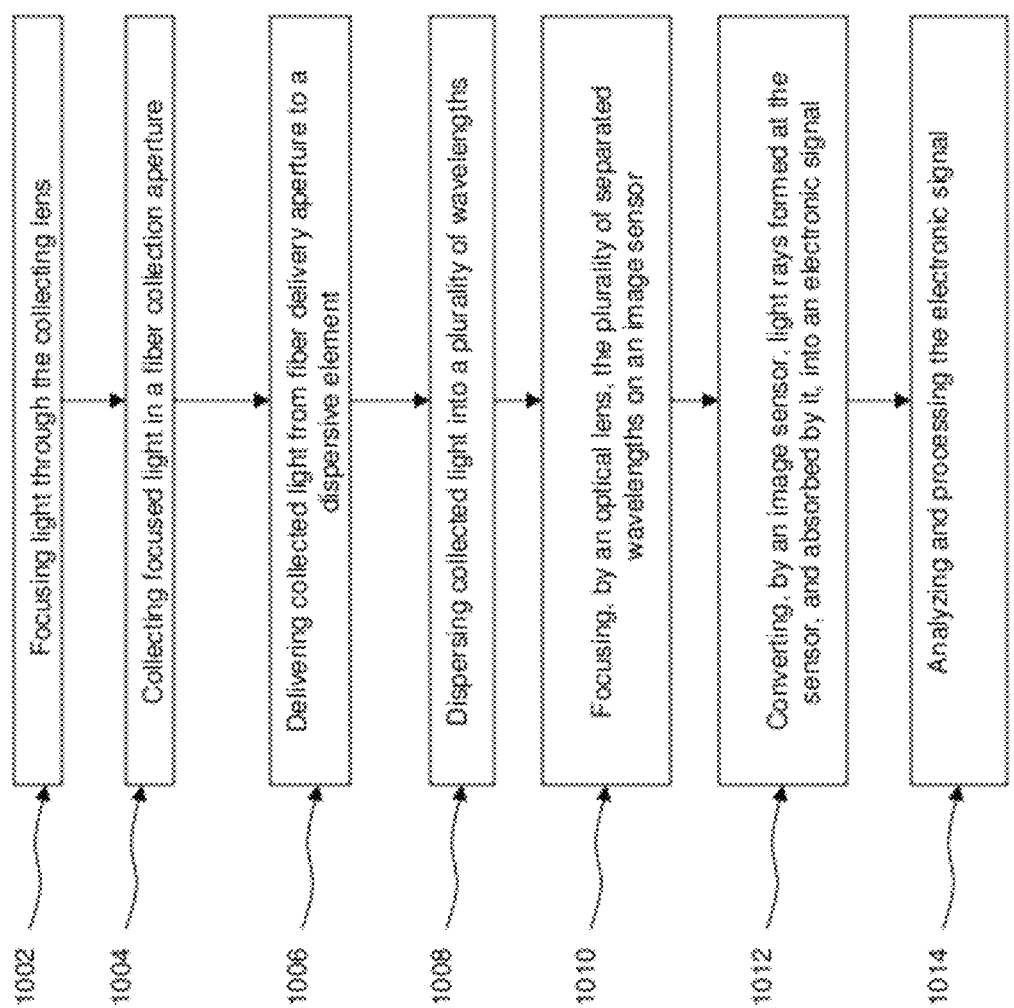

FIGS. 9 and 10 are methods for single-frame acquisition spatial, spectral, and polarization information from an object utilizing the mobile spectroscopic device of FIG. 2 and the processing of acquired data.

Figure 1:
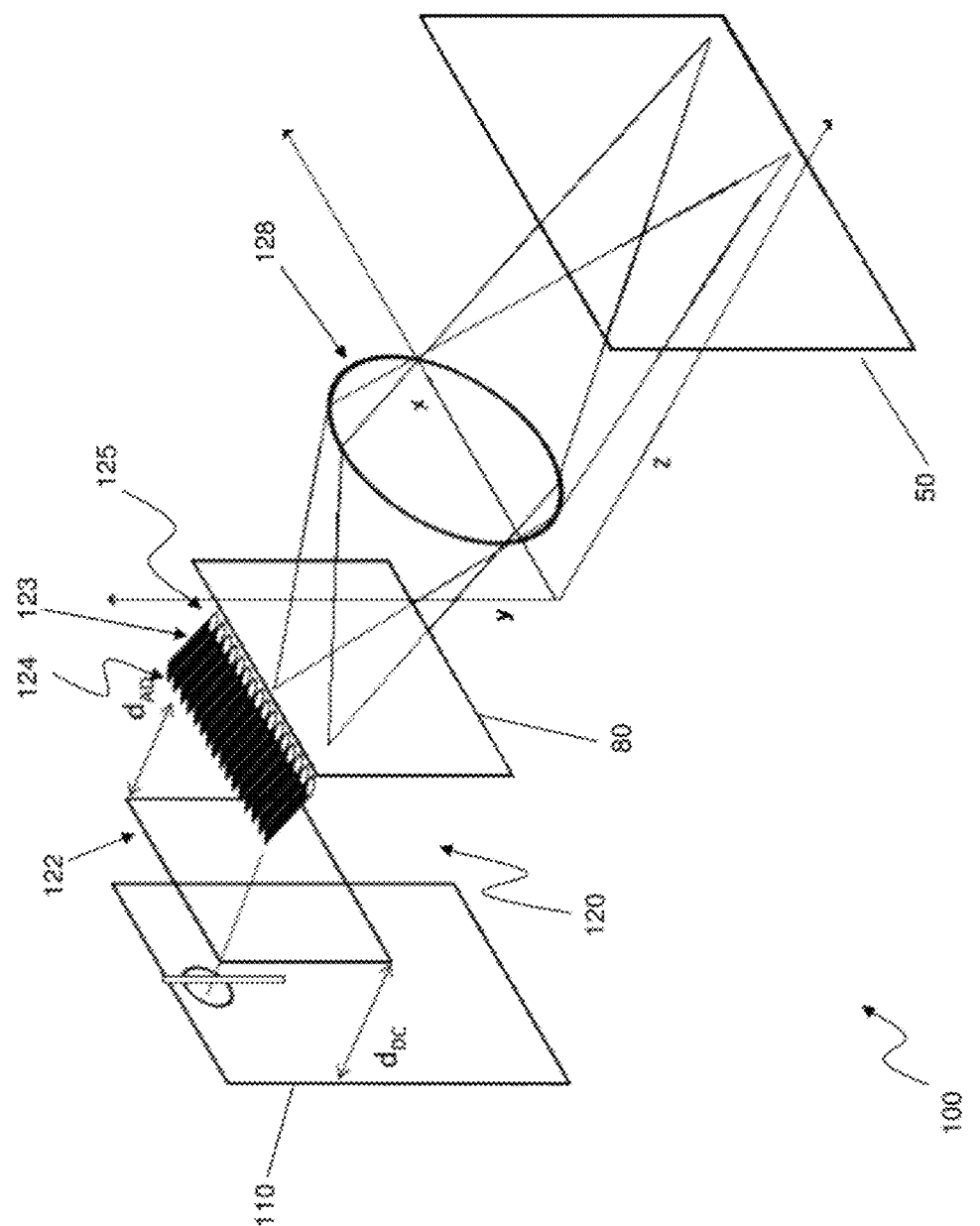
FIG. 1 is a block diagram illustrating components of a portable spectroscopic device according to an embodiment.
Figure 11:
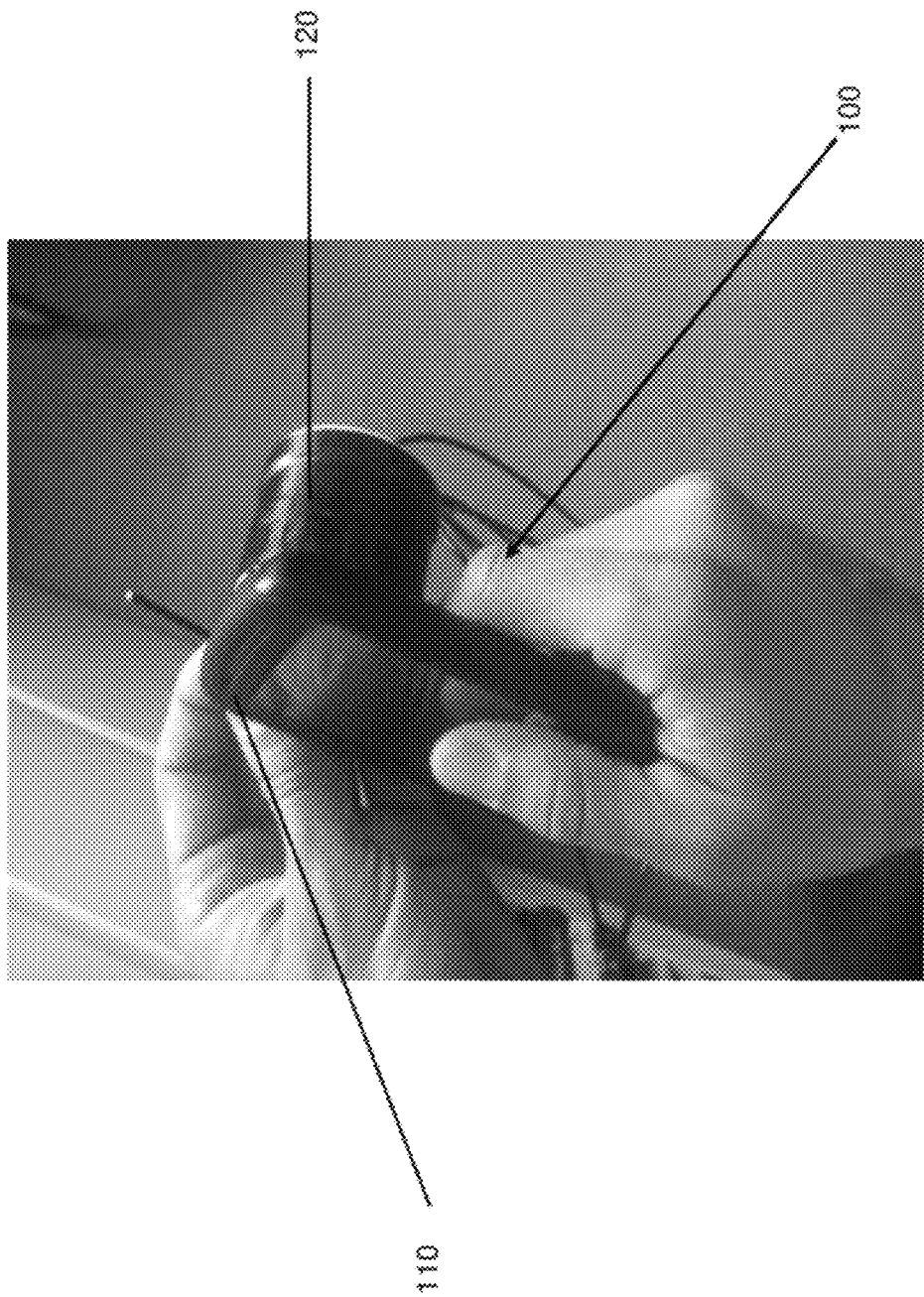

FIG. 11. is a depiction of an exemplary embodiment of the portable spectroscopic device of FIGS. 1 and 2.

Figure 5E:
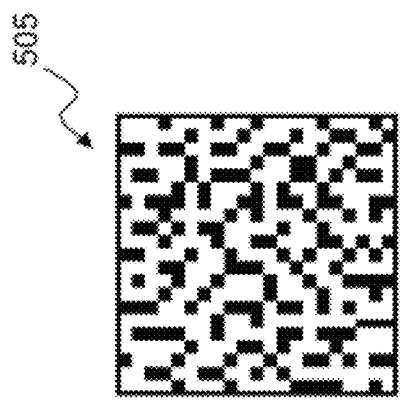
FIGS. 5A-5F illustrate possible collection aperture embodiments defined by either presence of optical fibers in an array (A,C,F) that define all paths of light propagation, or without the use of optical fibers (B,D,E) of the removable assembly of FIGS. 3A and 3B.
Figure 5F:
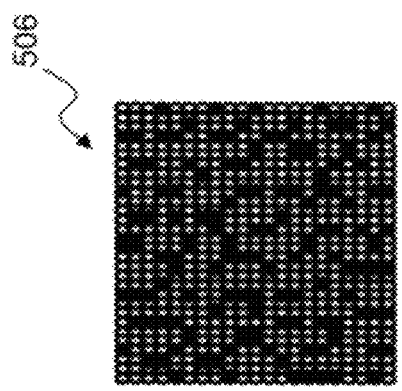
Figure 5C:
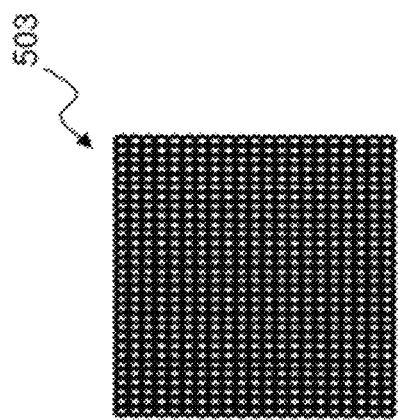
Figure 5D:
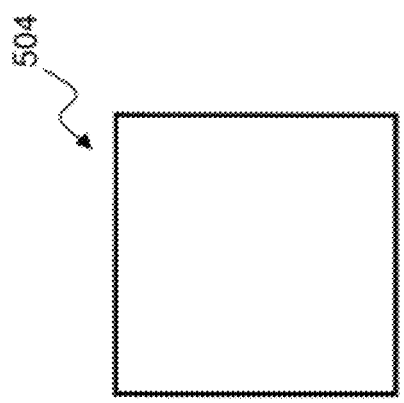
Figure 12:

FIG. 12. displays a single frame of data acquired using an open aperture as depicted in FIG. 5D that acquires spatial and spectral information in a single frame.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

FIG. 1 is a block diagram illustrating components of a portable spectroscopic device 100 according to an embodiment. The portable spectroscopic device 100 includes a dispersive element assembly 120 and a mobile computing device 110 and is configured to obtain and analyze spatial, spectral and polarization information in a single-frame and therefore as a function of time limited to the frame rate of the imaging device. The mobile computing device can be characterized as capable of 7 dimensional (7D) imaging (e.g., 3 dimensional (3D) spatial, 1 dimensional (1D) spectral, 2 dimensional (2D) polarization, and 1D time). Straightforward embodiments can realize an additional dimension of polarization (for a practical total of 8) by using two collection lenses 128 that are orthogonal and combining two sets of fiber collection apertures 123 into a common delivery aperture 124, which is easily realizable because optical fibers (or any light guide of preference, such as liquid light guides or hollow conduits that transport light) can be oriented at a variety of angles including an orthogonal configuration. The use of lenses is not necessarily required as the fiber ends can also be spatially arranged with spatial averaging defined by their collection angle.

The portable spectroscopic device 100 can be implemented in a communication network (not shown), thereby enabling the device 100 to transmit and/or receive data between mobile communication devices over the communication network, particularly one involving a wireless link, such as cellular, WiFi, ZigBee, BluTooth, etc. The communication network can be any suitable communication network configured to support data transmissions. Suitable communication networks include, but are not limited to, cellular networks, wide area networks (WANs), local area networks (LANs), the Internet, wireless networks, landline, cable line, fiber-optic line, etc. The portable spectrographic device 100, depending on an embodiment or desired functionality, can work completely offline by virtue of its own computing power (as we have demonstrated with a prototype stand-alone mobile Application on an Android system), on a network by sending raw or partially processed data, or both simultaneously.

The dispersive element assembly 120 of the portable spectroscopic device 100 includes a collection lens 128, an optical fiber assembly 123, and a dispersive element 122 and is removably coupleable to the mobile computing device 110. The dispersive element assembly 120 is configured to simultaneously obtain spatial, spectral, and polarization information from light from a physical object 50 and to further disperse the light into a plurality of different wavelengths. By obtaining spatial, spectral, and polarization information with the dispersive element assembly 120 in a single frame, data/information that is unobservable to an unaided human eye, or conventional imaging devices, could be identified by the portable spectroscopic device disclosed herein. In such cases, the source of contrast between objects, or an object from the background can be incidentally, or intentionally (by design of a barcode, for example) dependent on a more subtle combination of spatial, spectral and polarization dimensions. Furthermore, the dispersive element assembly 120 is removably coupleable to the mobile computing device 110 by any suitable coupling means. In some embodiments, a universal coupling means can be used. In other embodiments, a custom coupling means can be used.

The collection lens 128 of the dispersive element assembly 120 (shown, e.g., in FIGS. 1, 2, 3A, and 3B) is coupled to a distal end of the fiber assembly 123 and is configured to collect the optical spatial, spectral and polarization information from a physical object 50, as illustrated, e.g., in FIG. 1. The collective lens 128, while illustrated as a single lens, can in some embodiments be a plurality of lenses.

The fiber assembly 123 includes a plurality of fiber components. FIGS. 3A and 3B illustrate a lateral (side) side view of a fiber component 123a from the plurality of fiber components of the fiber assembly 123. Fiber component 123a comprises an elongated member having a proximal end portion 123$_P$ and a distal end portion 123$_D$ and defines an interior passage and an outer surface 123$_S$. Fiber component 123a further houses (e.g., sheaths) one or more optical fibers that function as waveguides for the transmission of light between the proximal and distal ends of the optical fibers. Moreover, the optical fibers (or equivalent waveguides or more generically, conduits for electromagnetic radiation) ensure more reproducible dispersion that is independent of the physical object's 50 spatial and angular distributions of light due to the properties of many commonly available optical fibers (or light conduits) that serve to randomize the light direction as well as polarization, thereby defining a consistent divergence and randomized polarization distribution of the light beam at the delivery aperture 124 to the dispersive element 122 (discussed in more detail below).

In some embodiments, two adjacent linear arrays of optical fibers with orthogonal linear polarizers can be disposed in front of each linear array for effectively serving to generate a line of spatial pixels that is reduced in spatial resolution by two-fold as compared to a single linear array. In such an embodiment, the two adjacent lines define one spatial dimension of pixels, one spectral dimension and two polarization dimensions. This embodiment requires a focusing lens, such as 128 of FIG. 1 (discussed in more detail herein) that creates an image at the plane (80 of FIG. 1) where the entrance aperture 125 of FIG. 1 of two linear arrays of polarization selecting fibers, or, equivalently light guides with polarization biases at the entrance aperture 125, are placed.

It is to be noted, however, that while FIGS. 3A and 3B depict a side view of a single fiber component 123a, each of the fiber components from the plurality are similarly constructed.

The proximal end portion 123$_P$ of the fiber component 123a is disposed adjacent to the dispersive element 122 at a distance d$_{AD}$ and defines a delivery aperture 124. The distal end portion 123$_D$ of the fiber 123a is coupled to the collection lens 128 and defines a collection aperture 125. The distal end portion 123$_D$ is configured to collect/receive light from the collection lens 128. Specifically, the fiber component 123 and the size and/or shape of the collection aperture 125 defined by the distal end portion 123$_D$ of the fiber component 123 defines a cone angle L$_{CA}$ for light collection. In other words, the collection aperture 125 collects all light within its field of view (i.e., defined cone angle L$_{CA}$). Thus, by modifying the size and/or shape of the distal end portion 123$_D$ of the fiber component 123, the cone angle can by modified for different and/or desired fields of view for light collection.

Figure 5A:
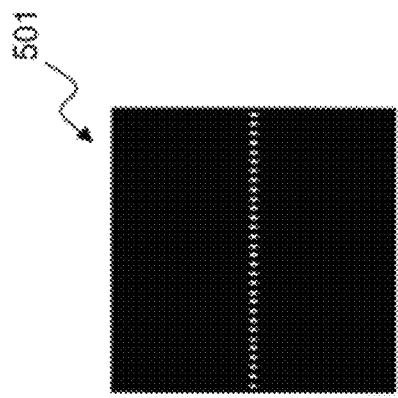
Figure 5B:
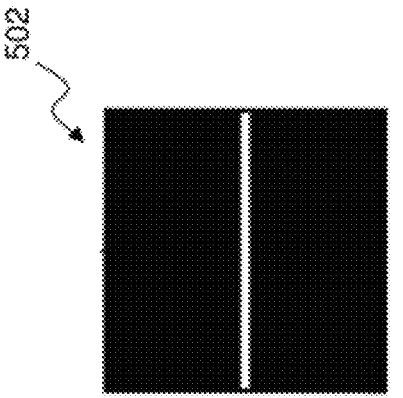

FIGS. 5A-5F illustrate collection aperture 125 configurations which can be defined by shaping the distal end portion 123$_D$ of the optical fiber component 123a of the dispersion assembly 120. By shaping the distal end portion 123$_D$, thereby shaping the collection aperture 125, the intensity profile can be optimized. Specifically, various configurations of the collection aperture 125 are possible to acquire simultaneous spatial, spectral, and polarization information. In an embodiment compatible with figure In FIGS. 5A and 5B, a one-dimensional fiber array and a one-dimensional open slit, respectively, are depicted. The linear fiber array, as illustrated in FIG. 5A or the open slit, illustrated in 5B, can be translated serially with respect to an image plane. Alternately, a one dimensional image can be collected without translation. In FIG. 5C, an entire image is collected and pixels are defined by individual light guides that serve to match an optimal divergence for the delivery aperture 124. FIG. 5D illustrates an embodiment including an open aperture. A raw data set acquired with such an aperture is displayed, for example, in FIG. 12. In such an embodiment, an entire image collected via the open collection aperture 125 enters the delivery aperture 124. FIG. 5E illustrates a conceptual embodiment of a defined collection aperture 125 including a mask to aid in decoupling spatial and spectral components. The mask can be, for example, any pattern to modulate intensity as a function of position and/or time in order to decouple the spatial and spectral components due the sacrifice in resolution of any one dimension (spatial, spectral and polarization dimension) that is required for the acquisition of all dimensions in a single frame using a practical sensor with finite pixel resolution. FIG. 5F, similar to that of FIG. 5E, illustrates a defined collection aperture 125 including a coded mask. In an embodiment, such as that illustrated in FIG. 5F, fibers can be used to match optimal divergence at delivery, via the deliver aperture 124 to the dispersion element 122. While FIGS. 5A-5E illustrate specific aperture configurations, one skilled in the art would recognize that other aperture configurations can be used.

The dispersion element 122 is disposed between the proximal end portion $123_P$ of the fiber assembly 123 and an optical lens 116 of the mobile computing device 110 and is configured to disperse light into a plurality of separated and divergent wavelengths. More specifically, the dispersion element 122 is separated from the mobile computing device 110 by a distance $d_{DC}$, which can be varied to a minimum value constrained by, perhaps, the housing of the dispersive element assembly 120 or, perhaps, part of the mobile computing device 110. By separating the wavelengths into a suitably divergent bundle of rays, the dispersion element 122 along with the delivery aperture, creates a virtual image observable by placing an imaging system containing a focusing lens and image sensor (e.g., computing device 110) behind the dispersion element 122. In addition to being observable by placing the computing device 110, the virtual image may be observable by a human eye behind the dispersion element 122. As noted above, once the assembly appropriately disperses the wavelengths, the light is then delivered to the mobile computing device 110 for analyzing and processing. In some embodiments, the dispersion element 122 can be, for example, a holographic transmission grating, using an optical fiber as the delivery mechanism. Other dispersion elements can be used provided that the divergence and dispersion of light can form a real image on the sensor with sufficient resolution.

The mobile computing device 110 typically includes a lens 116, an IR (infrared) filter 114, an optical sensor 112, and a processing unit 118 and is removably coupleable to the dispersion element assembly 120. The mobile computing device 110 is configured to receive the spectral, spatial, and polarization information/data from the dispersion element assembly 120 and utilize the received information/data in conjunction with certain available function of the mobile computing device 11. Such available functions include, for example, an accelerometer function, an acoustic function, a magnetometer function, geographic positioning function, etc. The mobile computing device 110 is further configured to download necessary data, programs, and/or applications for processing the spectral, spatial, and polarization information/data.

The lens 116 of the mobile computing device 110 is disposed between the dispersion element 122 of the dispersion element assembly and the optical sensor 112. In some embodiments, as illustrated in FIG. 2, the optical lens 116 can be a simple lens (e.g., consisting of a single optical element). In other embodiments, the optical lens can be a compound lens (e.g., an array lenses). The lens 116 receives the plurality of separated and diverged wavelengths (i.e., virtual image of a dispersed spectrum). The optical lens 116 focuses the virtual image onto the optical sensor 112 in order to form an observable spectrum, which is a real image.

In some embodiments, a polarizing beam-splitter (not illustrated) can be placed behind the lens 116 in which one linear array is facing an orthogonal direction to the another linear array in order to capture orthogonally polarized light directed at 90 degrees relative to an optical axis of the collecting lens 116, which is a common geometry for commercially available polarizing beam-splitters.

The IR filter 114 (which typically attenuates wavelengths above 700 nm from reaching the sensor chip) can be disposed between the lens 116 and the optical sensor 112 (discussed in more detain herein). Because of the high sensitivity of some conventional imaging sensors to near-infrared light (such as CMOS, CCD and other Silicon based detectors), the IR filter 114 can be configured to reflect and/or block mid-infrared wavelengths while passing visible light onto to the sensor. While the mobile computing device 110 of FIG. 2 includes an IR filter 114, in some embodiments, the IR filter can be removed. In such embodiments, the removal of the IR filter can (provided suitable permissions, security and regulatory guidelines are met), extend the spectral range above 700 nm (e.g., variable position, take in/out). It should be noted that similar embodiments can be realized in other regions of the electromagnetic spectrum where similar components (dispersive elements, light guides, fibers, lenses, sensor arrays and focal plane arrays) can be used to convert a self-contained imaging assembly (such as infrared or ultraviolet imagers) into a device that resolves a combination of spatial, spectral and polarization dimensions in a single frame.

The sensor 112 of the mobile computing device 110 is configured to collect spectral, spatial and polarization information from the physical object 50. More specifically, the received spectral, spatial, and polarization information is collected and distributed spatially over the pixels of the sensor 112 such that each pixel (or group of pixels) is a point in a space consisting of spatial, spectral and polarization dimensions (discussed in more detail herein). The sensor 112 converts the image (i.e., converts light rays) into an electronic signal by measuring the physical quantity of light and translating it into a form that can be read and processed by the processing unit 118 (discussed in more detail herein). The sensor 112 can be, for example, a complementary metal oxide semiconductor (CMOS) or charge coupled device (CCD), or any other suitable type of image sensor.

The processing unit 118 receives the multi-dimensional information/data converted by the optical sensor 112 for processing and analysis. In some embodiments, the multi-dimensional information/data can be transmitted to other electronic devices on the wireless communication network for further analysis, decision making, or for verification purposes.

The mobile computing device 110, via the processing unit 118, is further configured to extend the dynamic range. Extending the dynamic range results in obtaining better quality spectral data over a larger range of intensities. In some embodiments, the dynamic range can be extended by obtaining a plurality of images at different integration times, light intensities, or sensor gain settings, which are commonly known techniques to those familiar with the state of the art in imaging, spectroscopy and photography. These data sets are combined to neglect saturated pixels and to form one data set that has a larger dynamic range. In other embodiments, that are particularly suited for obtaining all of the desired information in a single frame (a unique contribution by our invention), dynamic range can be extended by fitting a shape function to a spatially distributed intensity profile. In our invention this utilizes the dispersion along a wavelength axis that contains a plurality of wavelengths, upon determining this axis along the sensor 112, a shape function can be fit to the intensity variation in the direction orthogonal to the wavelength axis by a curve fitting algorithm. For example, an expected embodiment that is consistent with our observations for a give fiber delivery aperture can use a Gaussian or similar "shape" function to minimize deviations between the function and a subset of data points (excluding, by construction all saturated pixels) to determine the amplitude, thereby extrapolating true peak intensity. The shape function is applied to an intensity profile that is computed by averaging pixels in a narrow region parallel to the wavelength axis (thereby representing a wavelength interval to be quantified) and plotting intensity as a function of pixel position orthogonal to this axis. A variety of methods can be used to determine the global minimum via a cost function such as chi-squared, familiar to those knowledgeable in the state of the art. Thereby the actual (e.g., true) intensity value can be extrapolated by virtue of the fit when in normal operation mode the sensor directly reads out a maximum range of 255 positive values, when actual intensity values may greater, thus extending the dynamic range. The geometry and properties of the delivery aperture and its light divergence can be changed to optimize one's ability to fit functions with fewer points and continue to extend dynamic range beyond the 8-bit depth available from the raw data files recorded in the mobile computing device in a single frame of data capture.

A standard commercial imager (e.g., any imager including a sensor and imaging assembly made to image light from an object projected onto the sensor) typically uses a range of intensity values, e.g., from 0 to 255 for example, on any given scale. However, spectra may often have a greater range (e.g., human vision having a range from 0 to 100,000 intensity, this is also a typical range for the absorption spectrum of organic compounds). In some embodiments, the dynamic range is extended, by virtue of allowing certain pixels to be saturated such that lower intensity values are greater than the noise floor (or dark counts). The present disclosure describes a method to allow for a certain degree of pixel saturation along the spectral axis, which combined with curve fitting can extrapolate intensity values beyond the range in a single frame capture of an imaging device.

The mobile computing device 110 is further configured to automatically calibrate the axis along the sensor corresponding to the wavelength. The use of automatic calibration data is discussed herein with reference to FIGS. 8A and 8B. In one embodiment, the mobile computing device 100 uses RGB information from the optical sensor 112 to uniquely define wavelength positions, as different wavelengths will have unique ratios in the optical sensor responses. Where the response of the individual channels overlap R (red) with G (green), G (green) with B (blue), these steep functions, illustrated, e.g., in FIG. 8C, can be used to automatically determine at least two distinct wavelengths, thereby enabling a calibration through curve fitting to map wavelength to position on the sensor when the dispersion along the wavelength axis is linear that enables two points to uniquely specify the linear axis (true for our embodiments as well as many commonly available dispersive elements such as diffraction gratings). In the event that the relative orientation of the physical axes between the dispersive element 122 and the mobile device 110 physical axis are not known, a linear regression algorithm can be implemented to empirically define the vector that best fits the spectral axis which is of great practical use to many embodiments. Other methods useful for defining the vector that best fits the spectral will be apparent to those skilled in the relevant art.

In FIG. 8A, an algorithm is applied for causing that the mobile computing device 110 to automatically detect all pixels that are part of the spectrum. Through the use of automatic calibration, pixel noise and stray light, such as is depicted in FIG. 8A, is eliminated. Additionally, because the spectral dimension may not always perfectly align with a particular axis of the optical sensor 112, linear regression is used to find the slope along the two dimensional gird that defines the spectral axis. The result of the automatic calibration, including the linear regression, is depicted in FIG. 8B.

By automatically calibrating, any properly configured mobile computing device can be coupled with any dispersive element assembly as disclosed herein and be used without the need for manual software calibration, e.g., repeated calibration through standard calibration lamps, or software interactive procedures prior to each data acquisition. Rather, through prior knowledge of a manufacturer sensor response, or a one-time calibration with known lamps, together with the algorithms disclosed herein, an untrained user can extract useful spectral information even with different embodiments of the mobile computing device 110 or the dispersive element 122. Additionally, automatic calibration can compensate for misalignment of the dispersive element assembly 120 and the mobile computing device 110, and allows the dispersive element assembly 120 and mobile computing device 110 to be used without requiring prior assumptions about how the dispersive element assembly 120 and mobile computing device 110 are coupled together.

The graphical representation of conceptual data obtained with the use of the portable spectroscopic device 100 as illustrated by the table 400 in FIG. 4 depicts one dimensional spatial with hyperspectral data obtained from the physical object 50, mapped to the optical sensor 112 (e.g., a two dimensional sensor array). Effective pixel 410 represents a unique spatial-spectral value. Sensor pixel 420 represents a unique point in a space that consists of spectral, spatial, and polarization information. Effective spatial and spectral resolution are defined by collection and delivery optics. In one embodiment, the effective resolution exceeds the sensor resolution, as illustrated, e.g., in FIG. 4. In another embodiment the effective and sensor resolutions are equal.

Figure 4A:
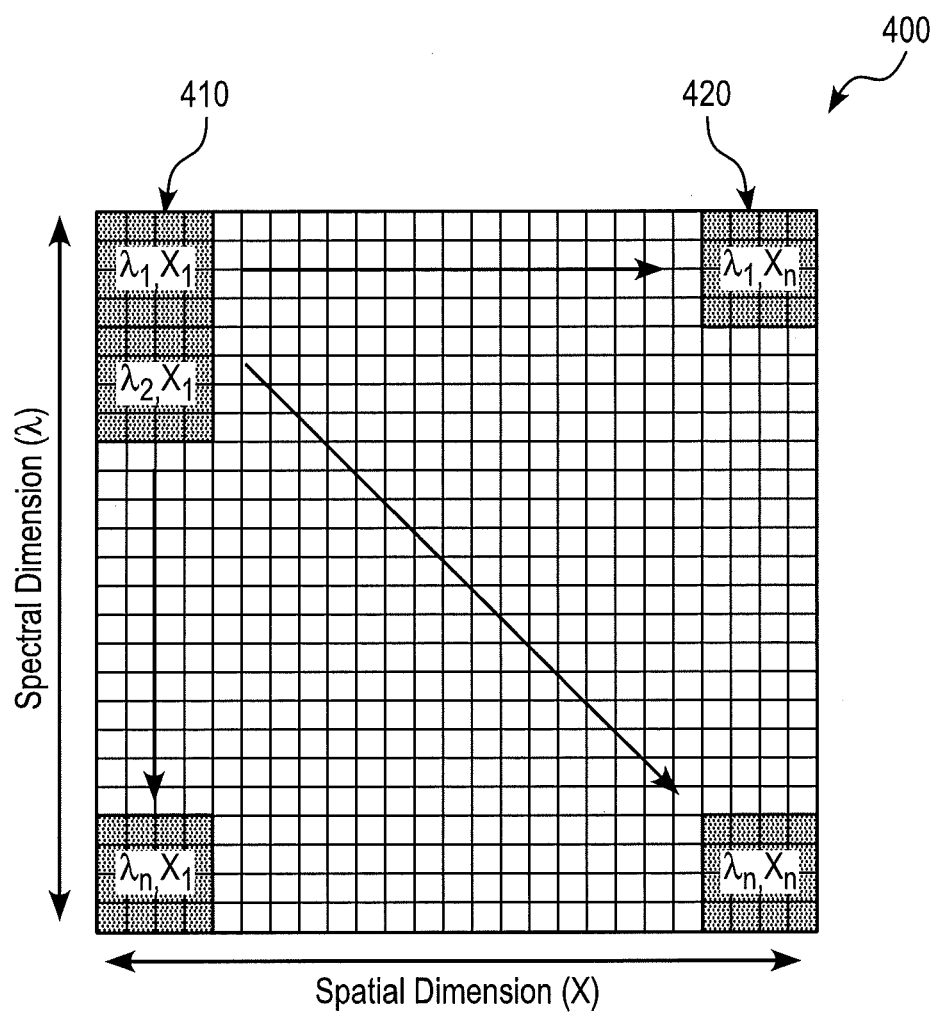
FIG. 4A is a graphical representation of conceptual data obtained with the use of the portable spectroscopic device of FIG. 1.
Figure 4B:
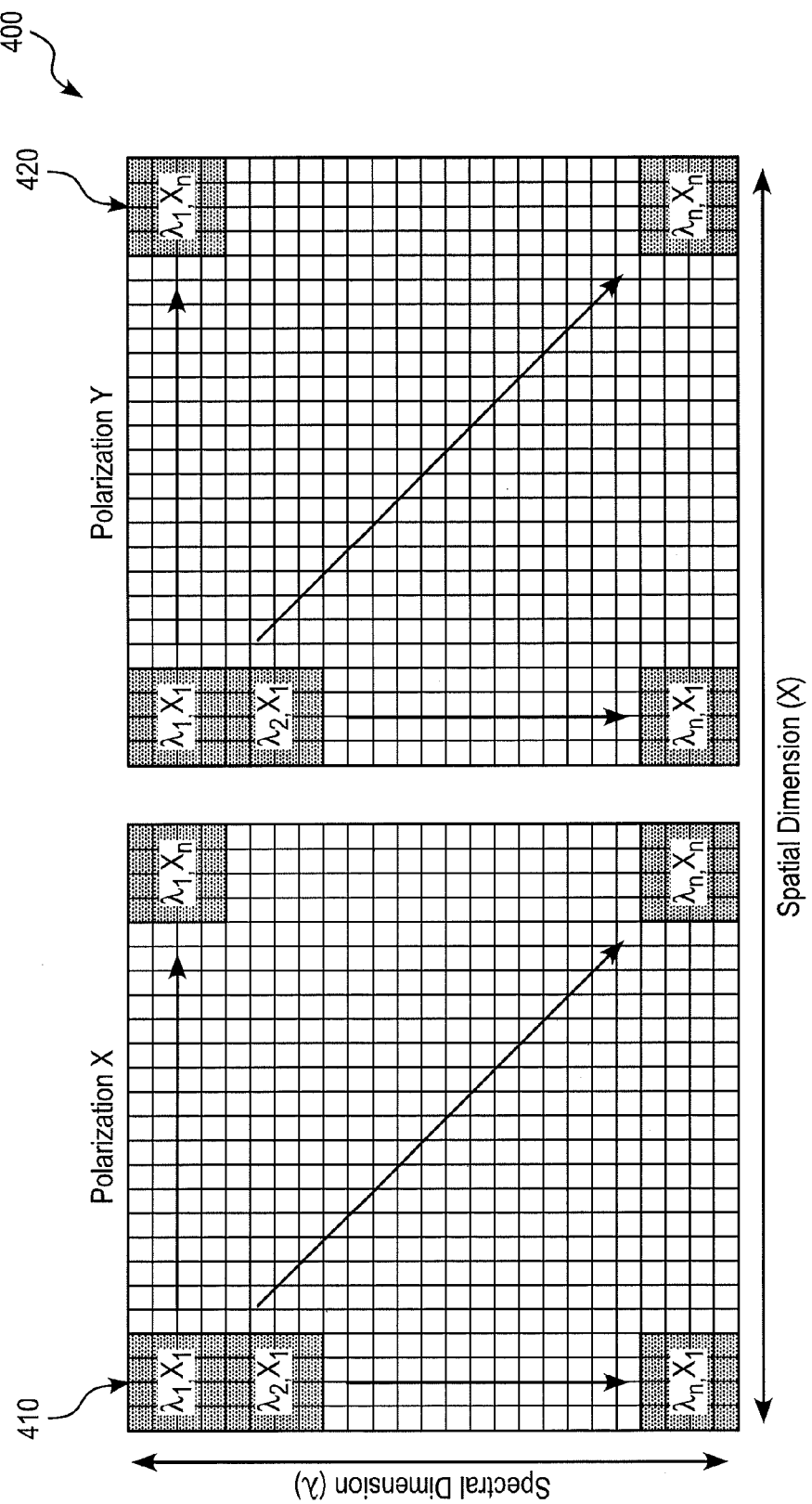
FIG. 4B is a graphical representation of conceptual data obtained with the use of the portable spectroscopic device of FIG. 1 that is consistent with an embodiment with one two adjacent linear fiber arrays at a collection aperture and spatially separated at a delivery aperture with each fiber array designed to collect orthogonal light polarizations.

In FIG. 4A the unique spatial-spectral value of the effective pixel 410 is represented as $\lambda_1, X_1$, where $\lambda$ represents wavelength and X represents space. The values $\lambda_1, X_1$ through $\lambda_n, X_1$ represent the plurality of wavelengths present at position $X_1$ in the object plane. The values $\lambda_1, X_1$ through $\lambda_1, X_n$, represent the multiple positions of wavelength $\lambda_1$ in the object plane. It will be apparent to persons having skill in the relevant art that a graphical representation of conceptual data obtained with the use of the portable spectroscopic device 100 (illustrated, e.g., in FIGS. 1 and 2) need not be limited to the representation illustrated in FIG. 4A. FIG. 4B further elaborates on this concept wherein two spatial-spectral images at orthogonal polarization are positioned adjacent to one another by appropriate placement of the collection and delivery apertures that may practically consist of two linear fiber arrays in one embodiment.

FIG. 6A is an illustration depicting a plurality of light sources and corresponding dispersed spectrums obtained utilizing the portable spectroscopic device 110 (as illustrated, e.g., in FIG. 2). Image 601 of FIG. 6A illustrates 3 different light sources (e.g., bulbs): (1) is a tungsten halogen bulb, (2) is a compact fluorescent bulb, and (3) a "bug light" bulb. These types of light bulbs are known to those having skill in the relevant art. The color of the light from each of the three light bulbs looks similar to the human eye, or to a standard commercial imager that contains only RGB information (3 spectral bands). Images 602, 603, and 604 show the dispersed spectrum of light bulbs 1), 2), and 3) respectively, as obtained utilizing the portable spectroscopic device 100 (illustrated e.g., in FIG. 2). The portable spectroscopic device 100 utilizes dispersion to separate the different wavelengths from the physical object 50 into different spatial positions, which results into a significant increase in the number of useful spectral bands over the 3 bands provided by RGB information, the effects of which are illustrated in the images 602, 603, and 604 of FIG. 2.

A graphical representation of the spectral data pertaining to the light sources derived from the dispersed spectrums of FIG. 6A is illustrated in FIG. 6B. The line graph of FIG. 6B contains spectral data for each of the three light sources shown in the image 601, whereby the intensity of all pixels within a given region of interests is averaged along the vertical axis, and the corresponding wavelength is plotted along the horizontal axis. The illustration of the difference in intensity at a plurality of wavelengths for each light bulb is a result of the dispersion of light by the portable spectroscopic device 110 (illustrated, e.g., in FIG. 2) and could not be performed a standard commercial image that contains only RGB information.

FIG. 7A illustrates spectral data for the light of a light emitting diode (LED) reflected 1) off of paper and 2) off of human skin, depicted in the form of a line graph with the reflected intensity plotted on the vertical axis and the approximate wavelength of light plotted along the horizontal axis. The data was obtained using the portable spectroscopic device 100 (illustrated, e.g., in FIG. 2 and similar to the embodiment shown in FIG. 11 but with an earlier brand of mobile communication device). FIG. 7B is a graphical representation of the analysis of the data in FIG. 7A. The analysis generates a curve proportional to the absorption spectrum of human skin, with spectral features due to melanin and blood. This illustrates a useful application of the portable spectroscopic device 100 of the present disclosure with potential for characterization in medical and cosmetic industries for applications such as predicting likelihood of sunburn, vitamin D deficiency, or matching make-up to skin type.

FIGS. 9 and 10 are flowcharts illustrating methods for simultaneously acquiring spatial, spectral, and polarization information from an object utilizing the portable spectroscopic device 100 (illustrated, e.g., in FIG. 2) and the processing of acquired data. At step 902 of FIG. 9, light is dispersed into a plurality of wavelengths. This step can be performed, for example, by the dispersive element assembly 120 (illustrated in, e.g., FIG. 2). At step 904, a processor of the mobile computing device determines an axis along an sensor corresponding to a wavelength from the plurality of dispersed wavelengths and, at step 906, the axis is automatically calibrated. The automatic calibrating can be performed, for example, by the processor the mobile computing device 110. It will be apparent to those having skill in the relevant art that, while steps 904 and 906 above are described as being performed by a single processor, in alternative embodiments the steps can by separate computing devices. Methods of performing the automatic calibration of step 906 are disclosed herein.

FIG. 10 shows a more detailed method pertaining to the acquisition and processing of spatial, spectral, and polarization information. At step 1002 of FIG. 10, upon light being collected from any given light source, such as a laser, laser diode, or light that is reflected, or emitted from an illuminated object (e.g., reflected, scattered, absorbed and re-emitted, etc), light is focused through a collecting lens. At step 1004, the focused (and released) light is collected in a fiber collection aperture and transmitted to a fiber delivery aperture via optical fiber housed within fiber components (e.g., a plurality of fiber optic cables comprising an array/assembly). Examples of fiber collection apertures are disclosed herein with respect to FIG. 5. At step 1006, the collective light is delivered from the fiber delivery aperture to a dispersive element. In some embodiments, a distance $d_{AD}$ separates the delivery aperture from the dispersive element. In other embodiments, a separation distance does not exist between the delivery aperture and the dispersive element. In other words, the proximal end portion of the fiber component defining the delivery aperture is flush against the dispersive element. At step 1008, the dispersive element disperses the collected light into a plurality of wavelengths.

At step 1010, an optical lens of the mobile computing device receives and focuses the plurality of separated wavelengths on an imaging sensor of the mobile computing device, and at step 1012, the sensor converts the image of light rays formed at the sensor and absorbed by it, into an electronic signal. At step 1014, the electronic signal (including spatial, spectral, and polarization information) is analyzed and processed by a processor of the mobile computing device, or a remote computer after transferring data.

FIG. 11 is a depiction of an exemplary embodiment of the portable spectroscopic device 100 including the removable dispersion assembly 120 and mobile computing device 110

As discussed in detail above, by collecting both spatial and spectral information, along with polarization information in a single frame, detection of variations in spectral and polarimetric signatures as a function of position are obtainable rapidly (as limited by the required integration time of a single frame to achieve sufficient signal to noise ratio). Moreover, such obtained information may not typically be unobservable to an unaided eye. Thus, in some embodiments, the portable spectroscopic device can be configured to detect camouflage from a background (e.g., foliage) or unique tags used in barcoding applications or invisible "watermarks". In other embodiments, the portable spectroscopic device is configured imaging of skin, paints, textiles, or performing absorption measurements in chemical and molecular biology applications by measuring the spectral attenuation of light through a liquid sample. Another embodiment may include using it in conjunction with an eye-piece in a microscopes, telescopes, ophthalmoscopes and other devices, the use of an eye-piece nearly ensures compatibility as they are designed for the human eye and therefore many imagers whose optics are designed to mimic a human eye's response. In ophthalmoscopes, for example, the portable spectroscopic device can be used to detect variations in chemical composition, such as macular pigment in the human retina, blood oxygenation in the retina for possible diagnosis of diabetic retinopathy or retinal neovascularization, as well as polarimetry that is also being used to detect early signs of age-related macular degeneration. In yet other embodiments, the portable spectroscopic device is configured to detect melanoma on human skin according to validations with other clinical studies.

By further obtaining polarization information, simultaneously with spatial and spectral information, an additional source of contrast is added. The portable spectroscopic device is further applicable for, e.g., rejecting surface reflections from water and probing spectral properties beneath the surface or behind glass.

While various exemplary embodiments of the disclosed device have been described above, it should be understood that they have been presented by way of example only, and not limitation. For example, while the disclosure describes single-frame acquisition of spatial, spectral, and polarization information from a physical object, in some embodiments, the removable dispersion assembly can obtain spatial information only. In other embodiments, the dispersion assembly can obtain spectral information only. In yet other embodiments, the dispersion assembly can obtain spatial and spectral information. Polarization alone is an obvious method familiar to those knowledgeable in photography and other forms of scientific and recreational imaging.

Where methods described above indicate certain events occurring in certain order, the ordering of certain events may be modified. Thus, the breadth and scope of exemplary embodiments of the disclosed device should not be limited by any of the above-described embodiments but should be defined only in accordance with the following claims and their equivalents.

The previous description of the various embodiments is provided to enable any person skilled in the art to make or use the invention recited in the accompanying claims of the disclosed device. While exemplary embodiments of the disclosed device have been particularly shown and described with reference to embodiments thereof, it will be understood by those skilled in the art that many variations, modifications and alternative configurations may be made to the invention without departing from the spirit and scope of exemplary embodiments of the disclosed system.

What is claimed is:

1. A portable spectroscopic device for acquiring single-frame spatial, spectral and polarization information of an object, the portable spectroscopic device comprising:
    a modular dispersion element assembly configured to disperse light into a plurality of different wavelengths; and
    a mobile computing device removeably coupleable to the dispersion element assembly and including an optical sensor, wherein the mobile computing device is configured to:
        receive and analyze the plurality of wavelengths from a dispersion element of the dispersion element assembly,
        generate an intensity profile by averaging pixels in a narrow region parallel to a wavelength axis and plotting intensity as a function of pixel position orthogonal to the wavelength axis,
        fit a shape function to the intensity profile, and
        extrapolate, from parameters returned from fitting the shape function, intensity values.

2. The portable spectroscopic device of claim 1, wherein a combination of data sets neglects saturated pixels.

3. The portable spectroscopic device of claim 1, wherein an actual intensity value is obtained based on the fitting of the shape function to the intensity profile.

4. The portable spectroscopic device of claim 1, wherein the mobile computing device is associated with a wireless communication network.

5. The portable spectroscopic device of claim 1, wherein fitting the shape function to of the intensity profile achieves a saturation of pixels having intensity values below a predetermined threshold value and wherein pixels having intensity values below the predetermined threshold value become "visible" by exceeding a noise floor due to inadequate sensitivity and dynamic range of the optical sensor.

6. The portable spectroscopic device of claim 1, wherein an actual intensity value is determined via the fit of the shape function to the intensity profile.

7. The portable spectroscopic device of claim 1, wherein the dispersion element assembly defines a collection aperture and a delivery aperture.

8. The portable spectroscopic device of claim 7, wherein by shaping components of the dispersion element to define the collection aperture of the dispersion element, the intensity profile is optimized.

9. A portable spectroscopic device for acquiring spectral and polarization information from an object, the portable spectroscopic device comprising:
    an optical sensor device including a lens and a sensor; and
    a dispersion element configured to be removeably coupled to the lens of the optical sensor device and to disperse light into a plurality of different wavelengths, wherein the optical sensor device is configured to receive the plurality of wavelengths from the removable dispersion element, to determine an axis along the optical sensor corresponding to a wavelength from the plurality of wavelengths, and to automatically calibrate the axis along the optical sensor corresponding to the wavelength, wherein
    the calibration includes fitting a shape of an intensity profile upon determining the axis along the sensor corresponding to a wavelength position of the wavelength from the plurality of wavelengths and further upon determining an intensity profile in a direction orthogonal to the axis along the sensor corresponding to the wavelength position of the wavelength from the plurality of wavelengths, and
    the intensity profile is generated by averaging pixels in a narrow region parallel to a wavelength axis and plotting intensity as a function of pixel position orthogonal to the wavelength axis.

10. The portable spectroscopic device of claim 9, wherein a color sensor is configured to determine at least two spatial positions along the optical sensor corresponding to two given wavelength regions from the plurality of wavelengths.

11. The portable spectroscopic device of claim 10, wherein the determination of the at least two spatial positions results in a transformation of spectral overlap of different color channels into a spatial overlap on the optical sensor.

12. The portable spectroscopic device of claim 9, wherein the axis is automatically calibrated such that a well-defined calibrated light source having known spectral positions is not required.

13. The portable spectroscopic device of claim 9, wherein the optical sensor device has multiple focal plane elements situated one of: spatially, linearly, or spectrally.

14. A method of a portable spectroscopic device for acquiring simultaneous spatial, spectral, and polarization information from an object, the method comprising:
    coupling a modular dispersion element assembly to a mobile computing device, wherein the modular dispersion element assembly is removeably coupleable to a lens of the mobile computing device;

dispersing light, by the modular dispersion element assembly, into a plurality of different wavelengths;

determining an axis along an optical sensor of the mobile computing device corresponding to a wavelength from the plurality of wavelengths;

determining an intensity profile in a direction orthogonal to the axis along the sensor, such that calibrating the axis along the sensor corresponding to a wavelength position of the wavelength from the plurality of wavelengths includes fitting a shape of the intensity profile upon determining the axis along the sensor corresponding to the wavelength position of the wavelength from the plurality of wavelengths and intensity profile; and automatically calibrating, by the mobile computing device, the axis along the optical sensor corresponding to the wavelength from the plurality of wavelengths, wherein the intensity profile is generated by averaging pixels in a narrow region parallel to a wavelength axis and plotting intensity as a function of pixel position orthogonal to the wavelength axis.

15. The method according to claim 14, wherein automatically calibrating the axis includes determining, by a color sensor, at least two spatial positions along the optical sensor corresponding to given wavelengths from the plurality of wavelengths.

16. The method according to claim 15, wherein the determining of the at least two spatial positions results in a transformation of spectral overlap of different color channels into a spatial overlap on the optical sensor.

* * * * *